United States Patent
Soles et al.

(10) Patent No.: US 7,083,176 B2
(45) Date of Patent: Aug. 1, 2006

(54) WHEEL ALIGNMENT ARRANGEMENTS FOR VEHICLES

(75) Inventors: Peter J. Soles, Tecumseh (CA); Scott A. Kolp, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 324 days.

(21) Appl. No.: 10/752,286

(22) Filed: Jan. 6, 2004

(65) Prior Publication Data

US 2005/0146105 A1     Jul. 7, 2005

(51) Int. Cl.
  *B62D 17/00*    (2006.01)
(52) U.S. Cl. .............................. 280/86.755; 280/86.751
(58) Field of Classification Search ........... 280/86.755, 280/86.757, 86.751, 86.752, 86.753
  See application file for complete search history.

(56) References Cited

U.S. PATENT DOCUMENTS

| 4,267,896 | A | * | 5/1981 | Hendriksen | 280/86.75 |
| 4,493,493 | A | * | 1/1985 | Satchell et al. | 280/86.75 |
| 4,695,073 | A | * | 9/1987 | Pettibone et al. | 280/86.757 |
| 5,052,711 | A | * | 10/1991 | Pirkey et al. | 280/86.753 |
| 5,104,142 | A | * | 4/1992 | Tsubota et al. | 280/86.757 |
| 5,775,719 | A | * | 7/1998 | Holden | 280/86.75 |
| 6,457,728 | B1 | * | 10/2002 | Klais | 280/86.75 |

* cited by examiner

*Primary Examiner*—Ruth Ilan
(74) *Attorney, Agent, or Firm*—Laura C. Hargitt

(57) ABSTRACT

Control arms used to support a swivel member retaining a wheel of a vehicle are attached to the body or frame rail of the vehicle by U-shaped attachment brackets having walls with lateral slots therein, each of which receives a mounting bolt therethrough. The mounting bolts pass through bushings in the ends of the control arms to pivot the control arms on the vehicle body or frame rail. Adjacent to the heads of the bolts are pairs of reaction surfaces that in one embodiment of the invention are pairs of opposed projecting surfaces on the attachment brackets. Separate tools are provided which have cams thereon each having a first peripheral cam surface for engaging one of the reaction surfaces and a second peripheral cam surface for engaging the other reaction surface. Upon loosening nuts threaded on the mounting bolts and rotating the cams with levers, socket wrench handles or other drives, the bolts shift laterally in the lateral slots enabling adjustment of the camber and caster of the wheels. In another embodiment, the reaction surfaces are opposite sides of a pin projecting from one of the flanges and the cam is a curved slot within a cam portion of the tool.

21 Claims, 7 Drawing Sheets

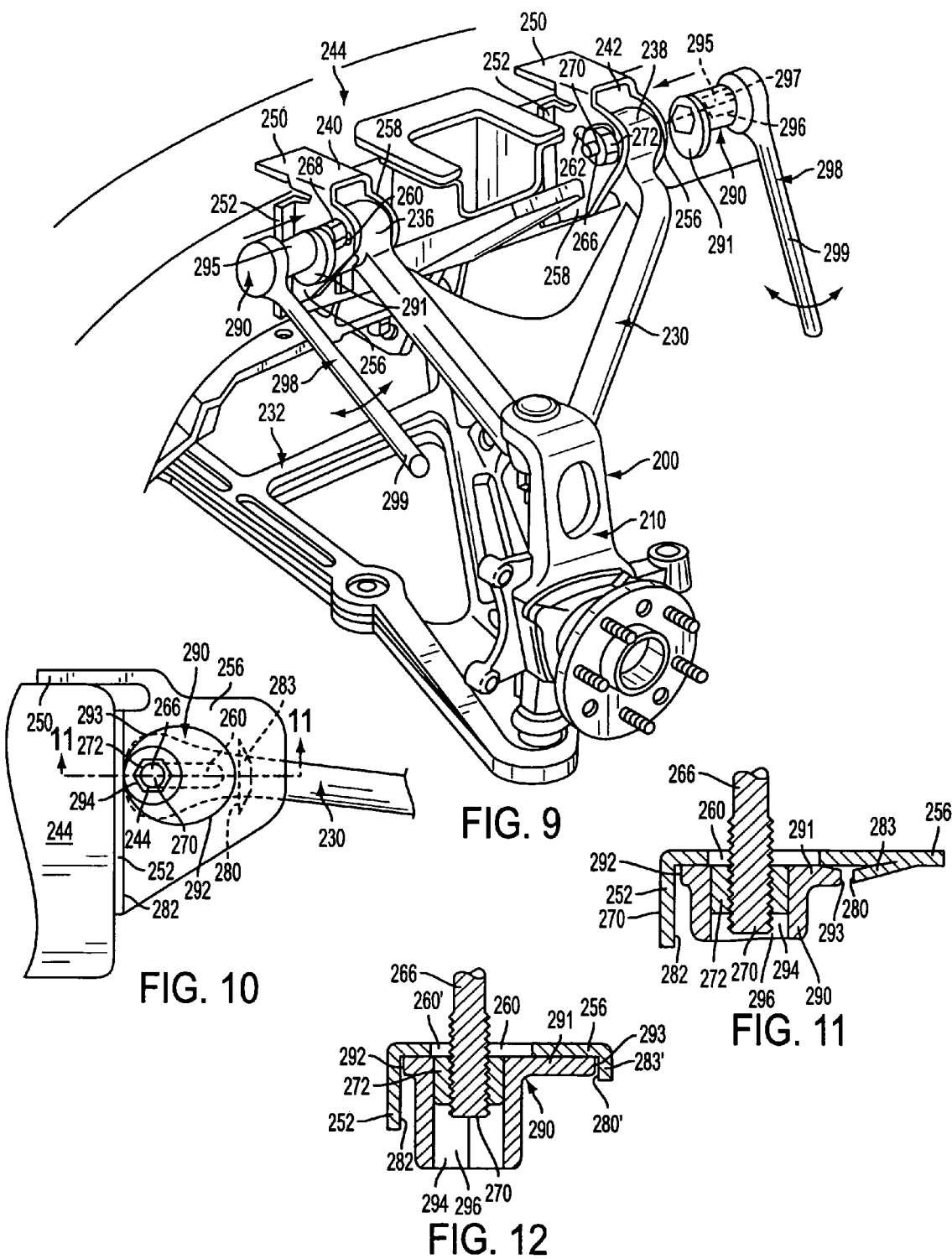

WHEEL ALIGNMENT ARRANGEMENTS FOR VEHICLES

FIELD OF THE INVENTION

The present invention is directed to wheel alignment arrangements for motor vehicles. More particularly, the present invention is directed to wheel alignment arrangements for motor vehicles that provide for adjustments in control arm positions in order to select desired camber and caster settings.

BACKGROUND OF THE INVENTION

In most situations, motor vehicles having steerable wheels support wheel axles on swivel members which are retained between upper and lower control arms (also known as A-arms or wishbones). The upper and lower control arms have front and rear legs that are pivotally mounted on the body or frame rails of the vehicle. Disposed between the lower control arms and body or frame of the vehicles are shock absorbers that include springs and dampers.

Steerable wheels of automotive vehicles require adjustment in camber and caster in order to maintain proper alignment. Camber is the amount that wheels are closer to one another at the bottom than at the top and caster is the slight backward tilt of wheels.

According to current practice, camber and caster are adjusted by alignment cams which are integral with couplings that attach the control arms to a vehicle's body or frame. Deletion of these alignment cams could reduce weight, space consumption and expense. Since there is a continuing need to make automotive components less massive, costly and intrusive, elimination of these integral alignment cams may be desirable.

SUMMARY OF THE INVENTION

In view of the aforementioned considerations, an alignment arrangement is provided for adjusting alignment of a vehicle wheel, wherein the alignment arrangement supports on a vehicle body or frame, inboard ends of a control arm, and includes a device comprising a pair of bushings and bracket structures which cooperate with at least one removable tool. Each bushing extends through one of the inboard ends of the control arm and has an opening therethrough which receives a mounting bolt. Each of the bracket structures are fixed with respect to the body or frame of the vehicle and are each defined by first and second opposed walls. The first and second opposed walls each have lateral slots therein receiving therethrough opposite ends of one of the mounting bolts. At least one of the walls has reaction surfaces thereon disposed adjacent to the slot therein. At least one removable tool includes a cam portion for engagement with the reaction surfaces on the brackets. This cam portion has a fixed axis of rotation with respect to the bolts on the brackets for shifting the bolts in the lateral slots upon rotation of the removable tool.

In accordance with a first embodiment of the invention, the reaction surfaces comprise a pair of opposed surfaces extending from one of the walls. When the cam portion of the tool is disposed between the reaction surfaces and rotated in a first direction, the bolt and control arm move away from the body or frame rail to adjust alignment of the wheel, and when the tool is rotated in a second direction, the bolt and control arm move toward the body or frame to adjust alignment of the wheel.

In accordance with a second embodiment of the invention, the reaction surfaces are provided by a projection extending from a wall of the bracket structure, the cam portion being a curved slot in a rotatable body driven by a lever or power tool, which curved slot receives the projection.

In a third embodiment of the invention, a first reaction surface is formed on a flange which is welded to a body or frame rail of the vehicle and the second reaction surface is on a deflected portion of one wall.

In a fourth embodiment of the invention the tool comprises a gear with an axial opening that is non-rotationally mounted on the head of the bolt when the tool is applied to the bolt. The cam portion of the tool comprises a pair of cooperating racks disposed between the reaction surfaces, each rack having a row of teeth facing the gear and an oppositely facing surface facing one of the reaction surfaces.

In preferred embodiment for the tool, the cam portion of the tool has a coupling thereon aligned with the axis of the bolt, the coupling cooperating with a stud of a wrench handle or a power tool.

In another aspect of the invention, the control arm is an upper control arm of a vehicle suspension having upper and lower control arms.

In still another aspect of the invention, the control arm is a lower control arm of a vehicle suspension having upper and lower control arms.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 9 is a perspective view of a third embodiment of the invention;

FIG. 10 is a side view of a preferred camless U-shaped bracket used with the third embodiment of FIG. 9;

FIG. 11 is a top elevation taken along line 11—11 of FIG. 10;

FIG. 12 is a top view of an alternative embodiment of a camless U-shaped bracket used with the third embodiment of FIG. 9;

DETAILED DESCRIPTION

Figure 1:
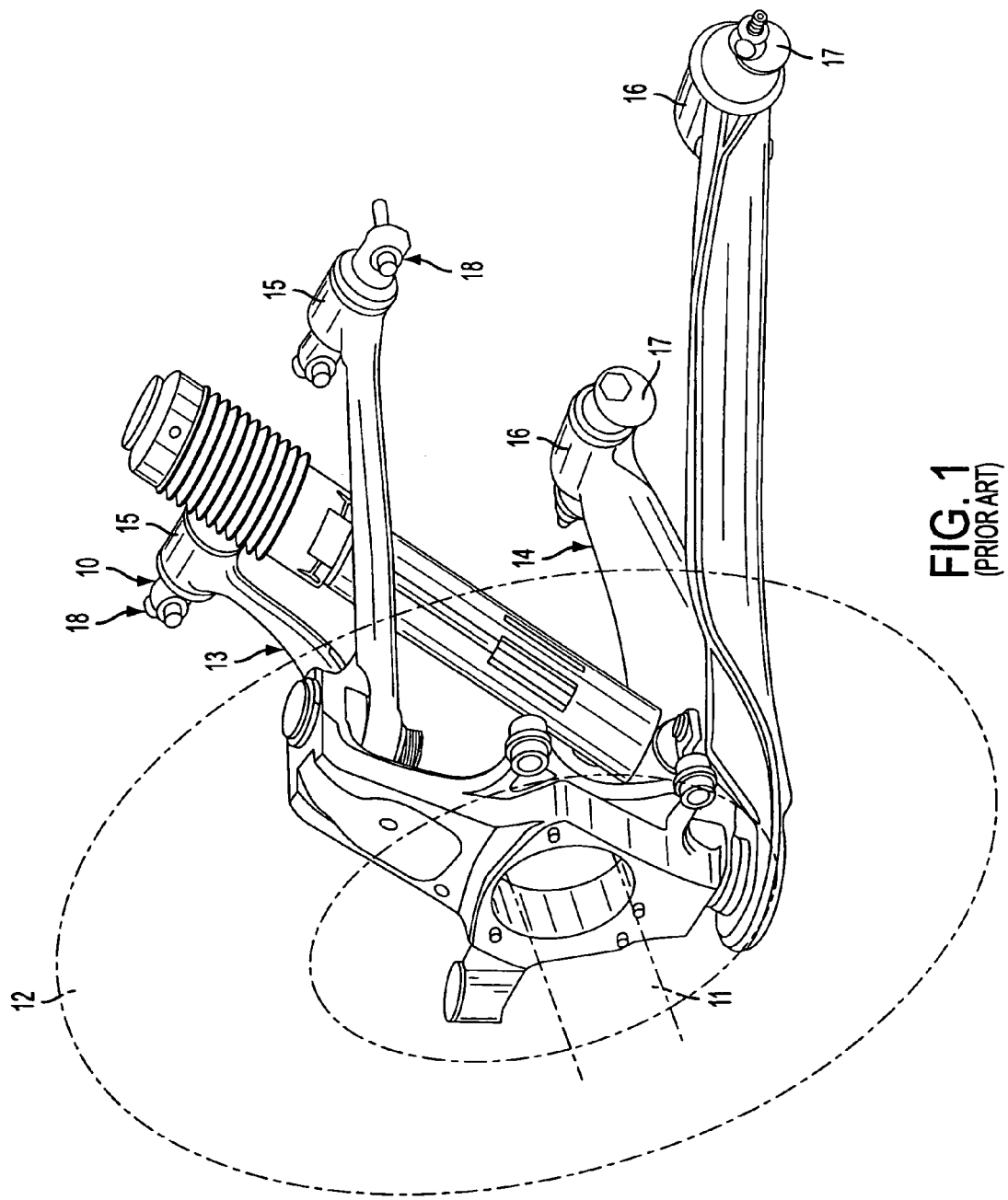
FIG. 1 is a perspective view of a prior art arrangement providing for alignment adjustment of a wheel attached by a pair of control arms to an automotive vehicle body or frame.

FIG. 1 shows a prior art suspension arrangement 10 for supporting a hub and bearing assembly 11, which includes an axle that mounts a wheel 12 of an automotive vehicle. The arrangement 10 utilizes upper and lower control arms 13 and 14, respectively, which have pairs of mounting bushings 15 and 16, respectively. Integral with the lower mounting bushings 16 on the lower control arm 14 are alignment cams 17. In accordance with the prior art arrangement 10, there are two alignment cams 17 for each wheel 12, resulting in four cams per automotive vehicle, which results in additional weight of about 1.5 lbs per vehicle. In the prior art configuration of FIG. 1, the upper mounting bushings 15 of the upper control arm 13 do not have adjustment cams 17, but are pivoted on bow tie connections 18. In other prior art configurations, not shown, alignment cams 17 are on the upper control arm 13 rather than the lower control arm 14. Generally, vehicles such as trucks have alignment cams on the upper control arms 13 while passenger vehicles tend to have alignment cams on the lower control arms 14.

Figure 2:
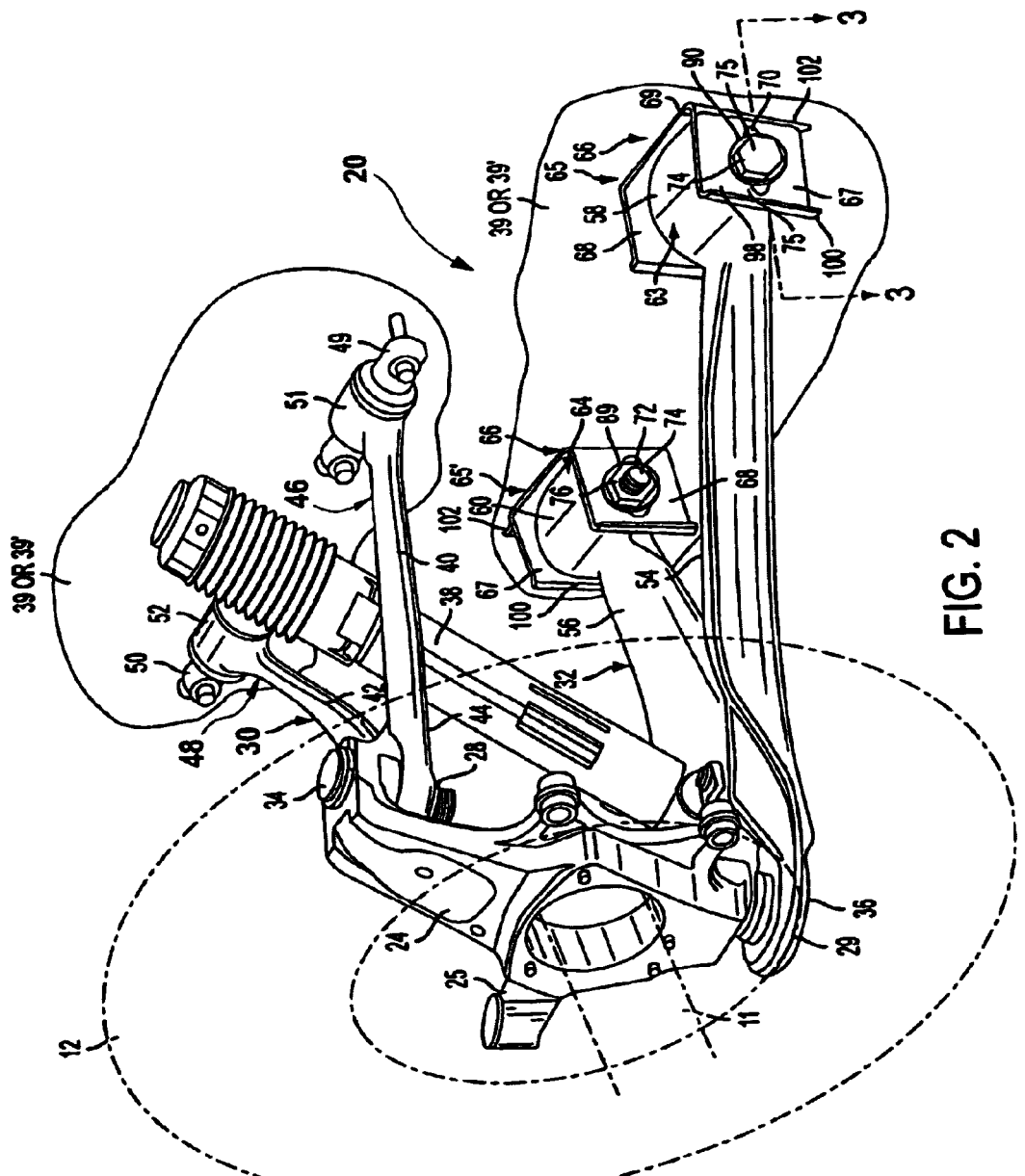
FIG. 2 is a perspective view of an alignment arrangement similar wherein a lower control arm has been modified in accordance with a first embodiment of the present invention.

Referring now to FIG. 2, there is shown an alignment arrangement 20, according to a first embodiment of the present invention, for supporting the hub and bearing assembly 11 that includes an axle mounting the front wheel 12 of the motor vehicle. While the present invention has application to the front wheels of vehicles, it is also useful for other wheels, such rear wheels, which may also be independently sprung and which in some vehicles are steerable. Generally, the alignment arrangement 20 is incorporated in a suspension system which comprises a swivel member 24 having a short arm to which a steering rod is attached. The swivel member 24 has upper and lower swivel joints 28 and 29 to which upper and lower control arms 30 and 32 are attached by swivel pins 34 and 36, respectively. A shock absorber 38, including a coil spring (not shown) and hydraulic damper extends between the lower wishbone 32 and body or frame rail 39 of the vehicle.

The upper control arm 30 has first and second legs 40 and 42 having a common outboard end 44 that receives the swivel pin 34 and inboard ends 46 and 48, respectively, that are pivoted to the vehicle body 39 by bow tie or tee joints 49 and 50 cooperating with bushing housings 51 and 52. The lower control arm 32 includes first and second legs 54 and 56 that are pivoted by bushing housings 58 and 60 to the body 39 or frame rail 39' of the vehicle at inboard ends 63 and 64 of the lower control arm by similar camless alignment couplings 65 and 65', configured in accordance with a first embodiment of the present invention.

The camless alignment couplings 65 and 65' do not have the alignment cams 17 of FIG. 1. Each camless alignment coupling 65 and 65' includes a U-shaped control arm bracket 66 having projecting walls 67 and 68, which have laterally extending slots 70 and 72 therein that receive mounting bolts 74 having heads 75 and nuts 76. The U-shaped control arm brackets 66 for each of the camless alignment coupling 65 and 65' are substantially the same for each of the bushing housings 58 and 60 of the control arm 32. In the embodiment of FIG. 2 separate control arm brackets 66 are shown. While separate control arm brackets 66 are preferred, in an alternative arrangement the walls 67 and 68 are within indentations in the body 39 or frame rails 39', which walls "bracket" the bushing housings 58 and 60 by retaining the bushing housings therebetween.

Figure 3:
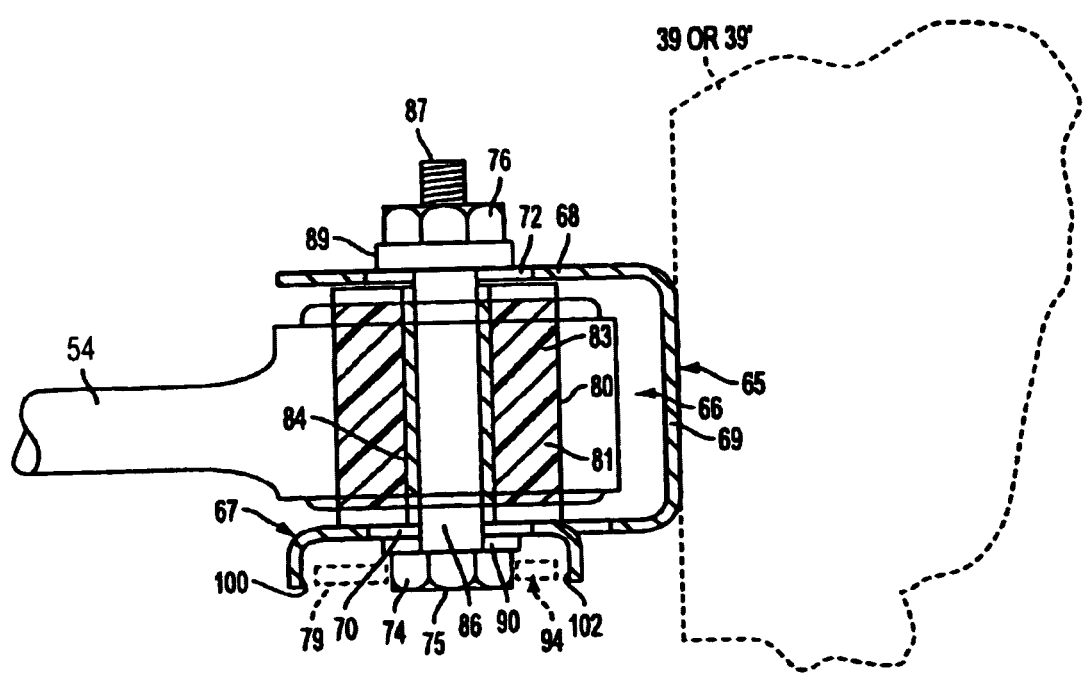
FIG. 3 is a top view of a portion of FIG. 2 taken along lines 3—3 of FIG. 2.

Referring now to FIG. 3, the bushing housings 58 and 60 are substantially the same, each having a circular opening 80 therethrough that receives a bushing 81. The bushing 81 fits tightly within the circular opening 80 and includes a resilient portion 83 made of rubber, or a similar elastic material, which resilient portion 83 is integral with a metal sleeve 84 that serves as a bearing for a smooth shank portion 86 of the mounting bolt 74. The mounting bolt 74 has a threaded end 87 on which the nut 76 is threaded. The nut 76 abuts a washer 89 positioned over the lateral slot 72, while the head 75 of the mounting bolt 74 abuts a washer 90 that is positioned over the lateral slot 70. In accordance with a preferred aspect of the invention the washers provide bearing surfaces against the walls 67 and 68. In accordance with another embodiment, not preferred, the bearing surfaces against the walls 67 and 68 are directly on the head 75 of the bolt 74 and on the nut 76.

The combination of the mounting bolts 74 with the slots 70 and 72 and the walls 67 and 68 provides an inexpensive and reliable, camless mounting arrangement that does not need integral cams, such as the alignment cams 17 of FIG. 1, mounted therewith. In addition to not having integral alignment cams 17, the mounting bolts 74 used in the arrangement of FIGS. 2–5 are standard, unsplined bolts instead of being relatively expensive splined bolts used in the prior art arrangement of FIG. 1. The absence of alignment cams 17 from the camless alignment couplings 65 and 65' results in savings in assembly labor and reductions in plant inventory. The absence of alignment cams 17 of FIG. 1 also results in saving in mass (according to one example about 1.2 lbs. per vehicle), which when combined with other savings in mass contribute to an accumulated reduction in weight for the entire vehicle. In addition, since at least the integral alignment cams 17 on the prior art lower control arm 14 of FIG. 1 tend to project beyond the bushing housings 16 into space adjacent to the bushing housings, there is a reduction in space consumption proximate the lower bushing housings 58 and 60 of the present invention.

Figure 4:
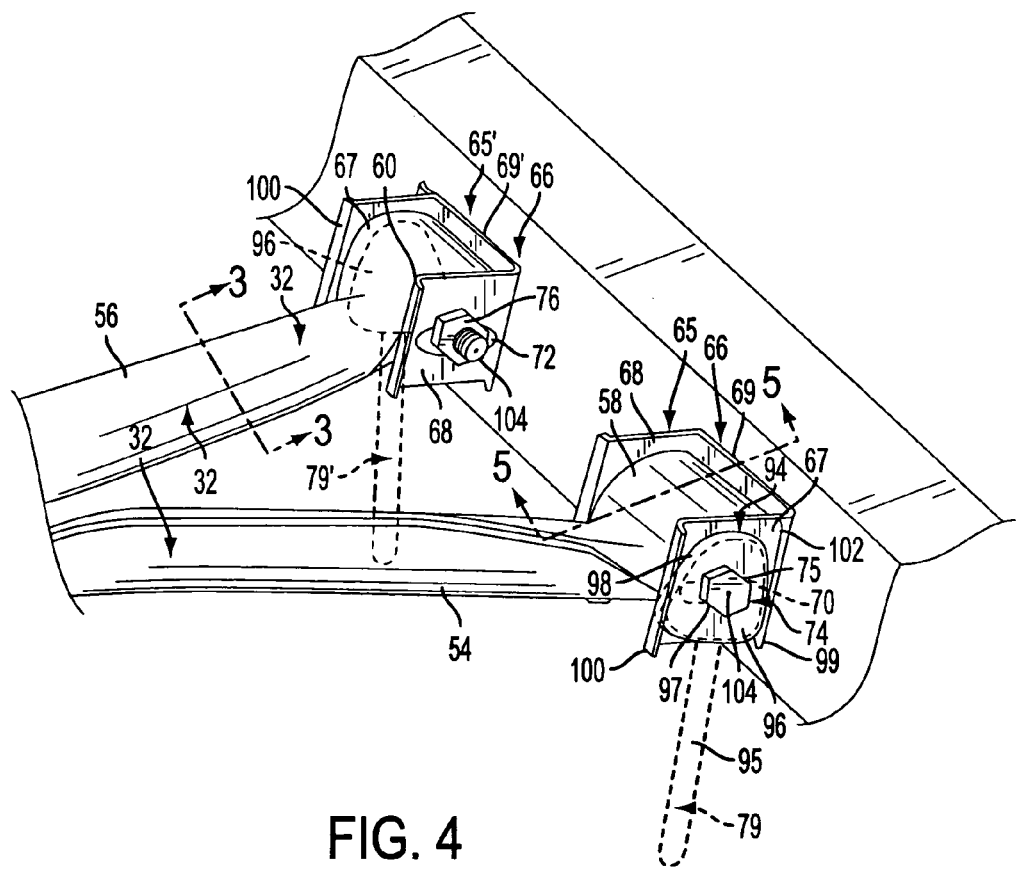
FIG. 4 is a perspective view of a portion of the lower control arm of FIG. 2 showing at least one tool being used to adjust the lower control arm in accordance with the principles of the present invention.

FIG. 4 illustrates the first embodiment of the present invention in combination with a pair of removable tools 79 and 79' shown in dotted lines. The removable tool 79 is used to adjust the position of leg 54 of control arm 32 with respect to camless alignment bracket 65, while the tool 79' is used to adjust the position of leg 56 with respect to camless alignment bracket 65'. Preferably, during assembly of the vehicle both tools 79 and 79' are employed on the bolts 74 of the respective camless brackets 65 and 65'. The tools 79 and 79' are rotated in the same direction in order to adjust camber of the front wheel 12 and in opposite directions to adjust castor of the front wheel by driving cam portions of the tools against reaction surfaces, as explained hereinafter.

As is seen in FIG. 4, in the absence of integral alignment cams 17, lateral adjustment of the position of bushing housings 50 and 52 with respect to the body 39 or frame rail 39' is accomplished by using the tools 79 and 79' configured as separate cam wrenches. The tools 79 and 79' each have a projecting handle 95 and a cam portion 96 with a hexagonal opening 97 therein that receives the hexagonal head 75 of one of the mounting bolts 74.

Figure 5:
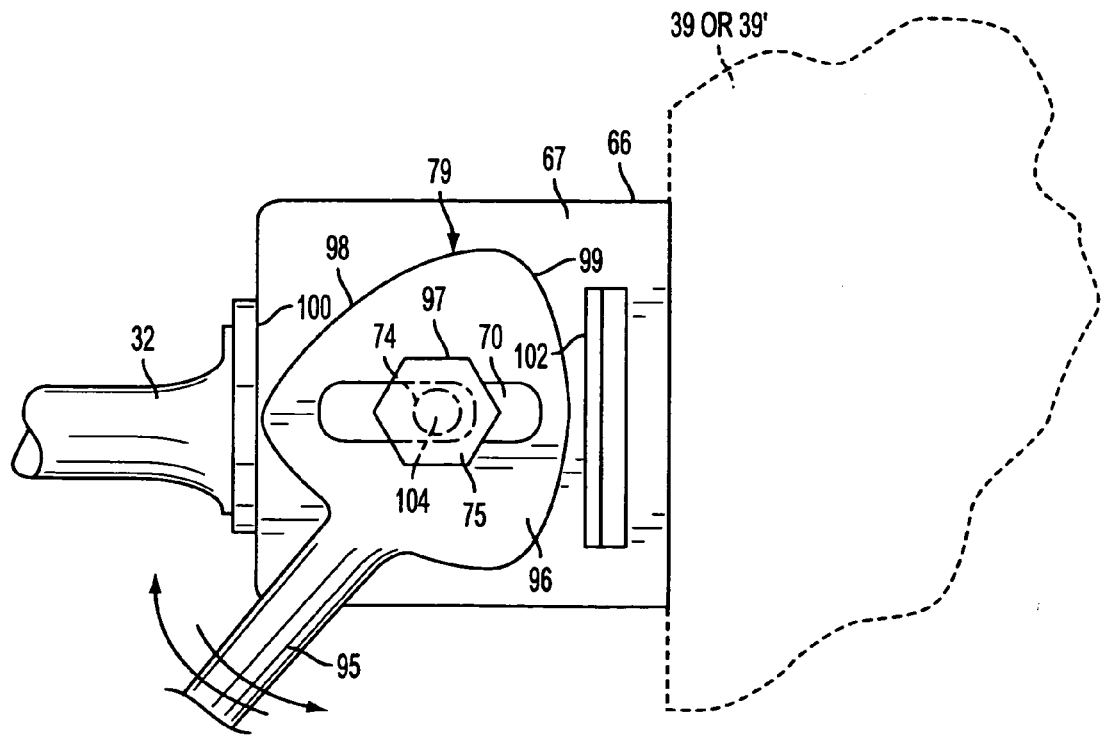
FIG. 5 is a side view of a portion of FIG. 3.

As is seen in FIG. 5 where only one of the tools 79 is shown in operation, it is seen that the cam portion 96 has a first peripheral cam surface 98 and a second peripheral cam surface 99. The first peripheral cam surface 98 engages a first reaction surface 100 which extends from the wall 67, while the second peripheral cam surface 99 engages a second reaction surface 102 that also extends from the wall 67. The reaction surfaces 100 and 102 are opposed surfaces which face one another. The handle 95 of the tool 79 and the cam portion 96 rotate about the axis 104 of the mounting bolt 74. This causes the first peripheral cam surface 98 to advance against the first reaction surface 100 on the flange 67 when the cam head 96 is rotated clockwise.

The second peripheral cam surface 99 advances against the second reaction surface 102 when the cam portion 96 is rotated counterclockwise. Since the mounting bolt 74 is free to shift laterally in the slot 70 as the cam head 96 rotates, and since the reaction surfaces 100 and 102 on the bracket 66 are fixed with respect to the body 39 (or frame rails 39') of the vehicle, the mounting bolt 74 necessarily shifts the control arm 32 toward the body or frame rail 39 when the first peripheral cam surface 98 is rotated to press against the reaction surface 100. The mounting bolt 74 also necessarily shifts the leg 54 of the control arm 32 away from the body or frame rail 39 and 39' when the second peripheral cam surface 99 is rotated to press against the second reaction surface 102.

The tool 79' is used to adjust the leg 56 of the control arm 32 by the bolt 74 associated with the camless alignment bracket 65' in a manner substantially identical to the use of the tool 79 to adjust the leg 54 of the control arm 32.

When proper alignment is achieved, the nuts 76 on the mounting bolts 74 are tightened to retain the mounting bolts and thus the lower control arm 32 in the desired position with respect to the slots 70 and 72, and thus in the desired position with respect to the body 39 or frame rail 39' of the vehicle.

Since the cam 96 is an integral or unitary part of the tool 79, separate alignment cams 17 are not carried by the suspension system 20, therefore the mass and consumption of space by the cams is eliminated from the vehicle. Moreover, the need to store alignment cams 17 in vehicle inventory is eliminated.

Figure 6:
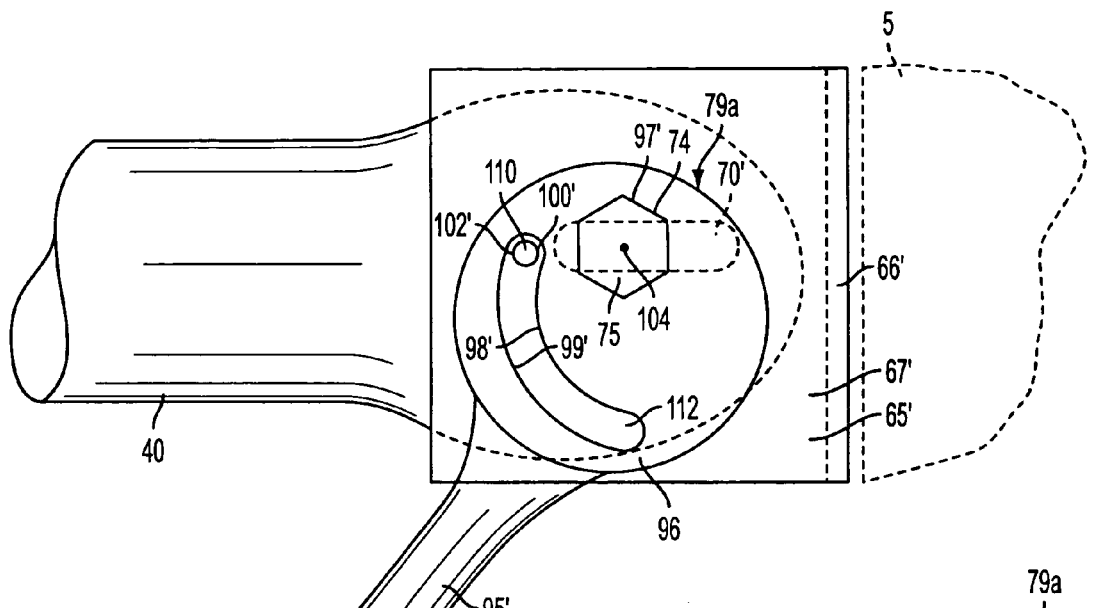
FIG. 6 is a side view of a second embodiment of the invention showing a first adjusted position of a control arm.
Figure 7:
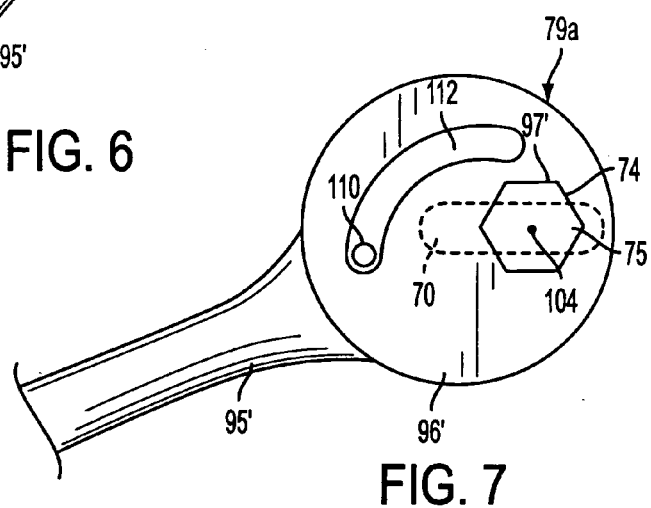
FIG. 7 is a side view, similar to FIG. 6, but showing a second adjusted position of the control arm.
Figure 8:
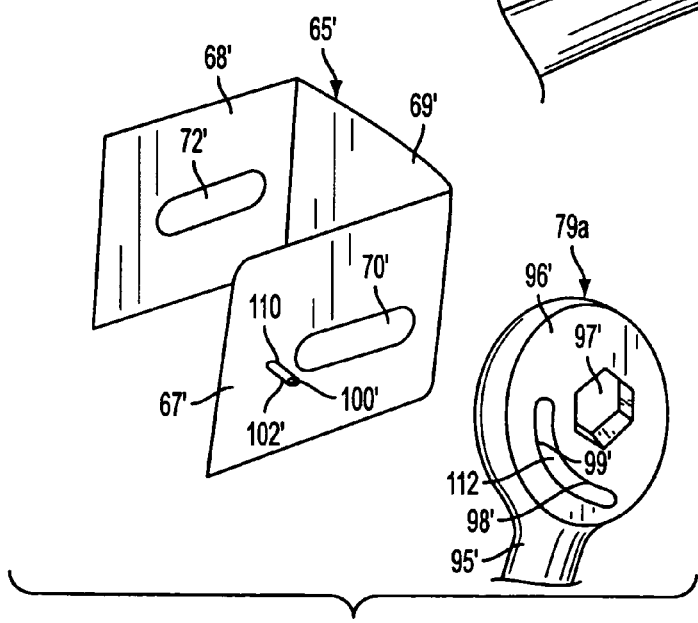
FIG. 8 is an exploded view of the second embodiment of FIGS. 6 and 7.

Referring now to FIGS. 6–8 there is shown a second embodiment of the invention wherein reaction surfaces 100' and 102' are on opposite sides of a projection, such as a pin 110. The pin 110 is received in a curved cam slot 112 disposed in a cam head 96' that is rotated by the handle 95' of a tool 79a. The cam slot 112 has a first cam surface 98' and a second cam surface 99' that push against the reaction surfaces 100' and 102'. Note that the cam surfaces 98' and 99' appear reversed in FIGS. 6 and 7 with respect to FIGS. 3–5, however this is because the cam surface 98' pushes the mounting bolt 74 to the left in the lateral slot 70', as seen in FIG. 6, while the cam surface 99 pushes the bolt 74 to the right in the lateral slot 70' toward the body 39, as seen in FIG. 7. FIG. 8 shows the attachment bracket 66' used with the control arm 32 and a separate tool 79a, which is used to adjust the lateral position of the mounting bolts 74 in the slots 70 and 72. The embodiment of FIGS. 6–8 is a pin-in-slot reacted embodiment rather than an edge reacted embodiment such as that of FIGS. 2–5.

Referring now to FIGS. 9-12 a third embodiment of the invention is shown wherein a suspension system 200 includes a swivel joint 210 pivoted on an upper control arm 230 and a lower control arm 232. In the third embodiment, the upper control arm 230 has a pair of bushing housings 236 and 238 that are pivoted to a pair of camless control arm brackets 240 and 242, configured in accordance with the present invention to provide an alignment arrangement, and welded to a frame rail 244. The lower control arm 232 is attached to the frame rail 244 with non-adjustable couplings such as the non-adjustable couplings provided by the bowtie connections 18 of FIGS. 1 and 2. The suspension system 200 is a preferred configuration for trucks.

The suspension system 200 is illustrated in FIGS. 9-12 as used for steerable front wheels, however the principles and structure of the suspension system 200 are applicable to rear wheels as well, steerable or unsteerable.

The camless control arm brackets 240 and 242 are U-shaped and preferably identical to one another, with the bracket 240 being a front bracket and bracket 242 being a rear bracket. Each of the brackets 240 and 242 has a top flange 250 for welding to the top surface of the frame rail 244 and a pair of side flanges 252 for welding to the inside surface of the frame rail. Each of the brackets 240 and 242 also have outer side walls 256 and 258, that have lateral slots 260 and 262, respectively therein. Bolts 266, each having a head 268 and a threaded end 270, pass through the lateral slots 260, through the bushing housings 256 and 258 and through the lateral slots 262. Nuts 272 are threaded onto the ends 270 of the bolts 266 to tightly retain the bolts 266 in fixed lateral positions in lateral slots 260 and 262 when tightened. The bushing housings 236 and 238 each have the structure shown in FIG. 3 and include a bushing with a resilient portion having an integral metal sleeve that receives a smooth shank portion of the bolt 266.

Referring now to FIGS. 10–12 it is seen that at least one of the walls 256 and 258 has a first reaction surface 280 and a second reaction surface 282. The second reaction surface 282 is on the flange 252 which is welded to an inside surface of the frame rail 244. As is seen in FIGS. 10 and 11 the first reaction surface 280 is formed by deflecting a knotched portion 283 of the wall 256 out of the plane of the wall. The embodiment of FIG. 12 has similarities to FIGS. 10 and 11, but in FIG. 12 the first reaction surface 280' is on a turnover flange 283' rather than being adjacent to a knotch portion.

A tool 290 having a cam portion 291 with peripheral cam surfaces 292 and 293 has a socket 294 formed in a collar 295 that receives either the head 268 of the bolt 266 or the nut 272. In FIG. 11, the nut 272 is received in the socket 294, however the head 268 may also be received in the socket in the manner shown in FIGS. 3–5. The socket 294 of the tool 290 has a lug receiving portion 296 which is substantially square in cross section that receives a lug 297 of a socket wrench 298 to retain and drive the cam portion 291 of the tool 290. The socket wrench 298 has a handle 299. As with the suspension system 20 of FIG. 4, the suspension system 200 of FIG. 9 uses a pair of detachable tools 290 to adjust camber and castor of the wheel supported by the suspension system by shifting the bolts 266 laterally in the slots 260 and 262.

Figure 13:
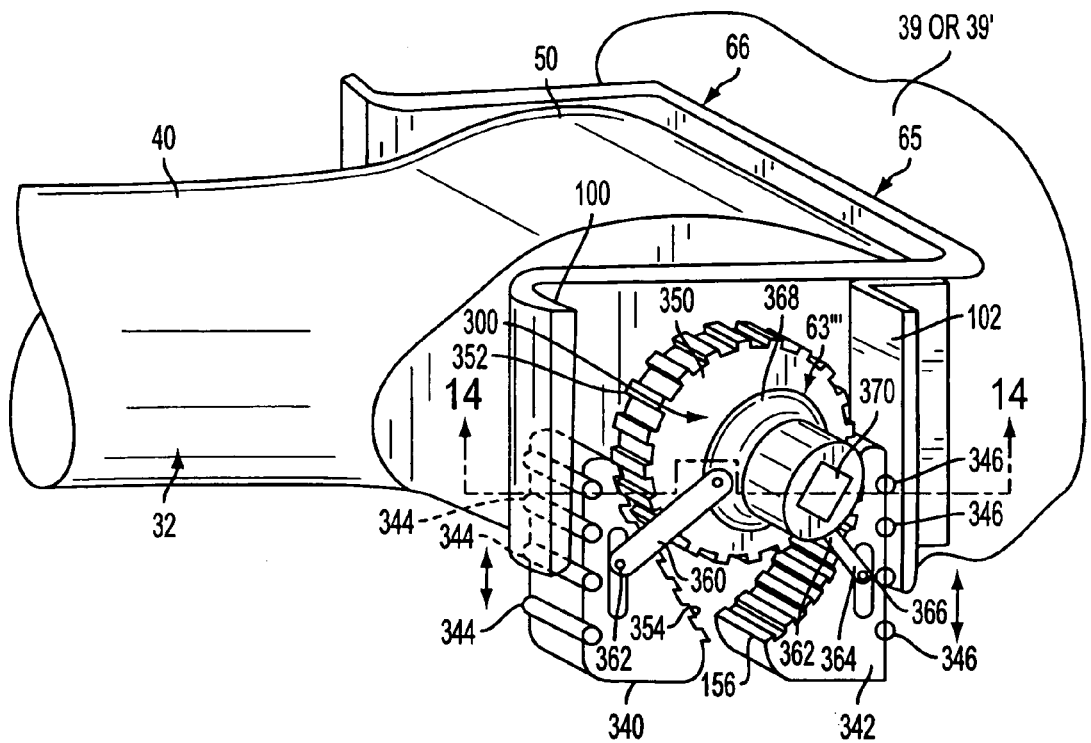
FIG. 13 is a side perspective view of a fourth embodiment of the invention.
Figure 14:
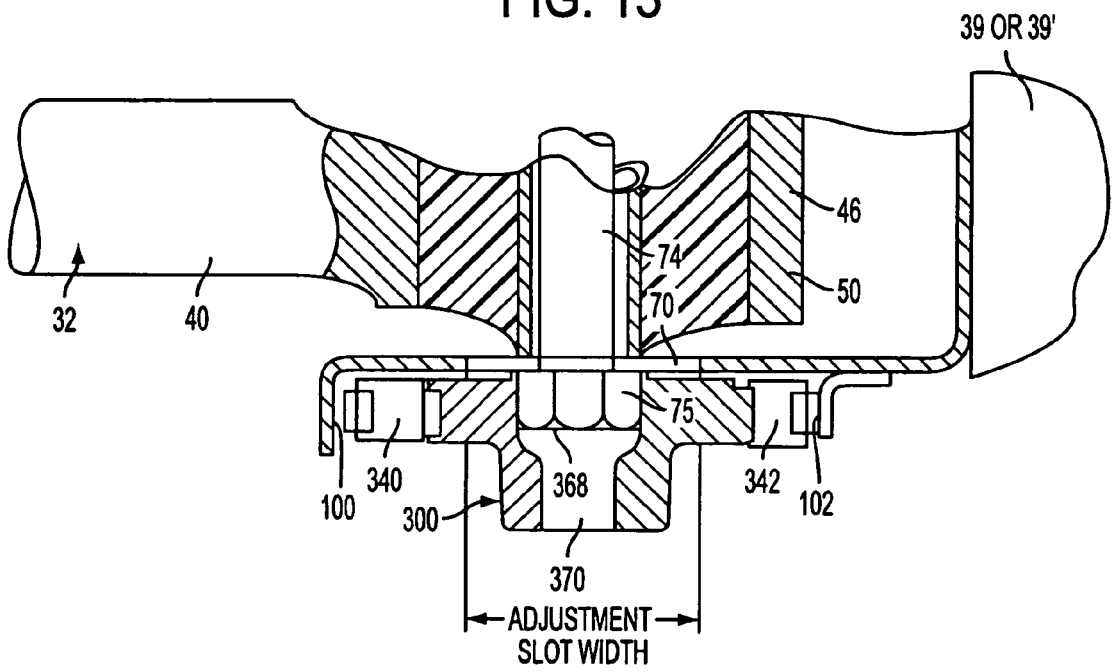
FIG. 14 is an elevation taken along lines 14—14 of FIG. 13.

Referring now to FIGS. 13 and 14 where a fourth embodiment of the invention is shown, the control arm bracket 66 for the control arms are the same as in FIGS. 2–5, however the tool 300 has another configuration wherein a pair of cams 340 and 342 interact with the first and second reaction surfaces 100 and 102. The cam 34 has a plurality of roller bearings 344 facing the first reaction surface 100, while the cam 342 has a plurality of roller bearings 346 facing the second reaction surface 102. The cams 340 and 342 are attached to a gear 350 that has peripheral teeth 352 that engage complementary teeth 354 and 356 on the cams 340 and 342, respectively. The cams 340 and 342 are linked to the gear 350 by links 360 and 362 that have pin-in-slot connections 364 and 366 with the cams. The gear 350 has a hub 368 which has a hexagonal socket portion 369 complementing the bolt head 75 and a square socket portion 370 therein to receive a lug of a ratchet wrench or power tool (not shown). When the gear 350 rotates in a clockwise direction, the gear teeth 352 on the gear engage the gear teeth 354 on the cam 340 to lift the cam and thus press the cam against the reaction surface 100. Simultaneously, the cam 342 is lowered so that the mounting bolt 74 and the control arm 40 are moved toward the reaction surface 102, and thus toward the body 39 or frame rail 39'. This causes the mounting bolt 74, engaged by the hexagonal socket portion of the tool 300 to shift to the left and move away from the vehicle body 39 or frame rail 39' as the mounting bolt slides axially in the slots 70 and 72. Rotation of the gear 350 in the counter-clockwise direction causes the bearings 346 of the second cam 342 to press against the second reaction surface 102. This shifts the mounting bolt 74 away from the second reaction surface 102, and thus away from the body 39 or frame rail 39' of the vehicle.

From the foregoing description, one skilled in the art can easily ascertain the essential characteristics of this invention, and without departing form the spirit and scope thereof, can make various changes and modifications of the invention to adapt it to various usages and conditions.

We claim:

1. An alignment arrangement for adjusting alignment of a vehicle wheel, the alignment arrangement supporting on a vehicle body or frame member inboard ends of a control arm that has at an outboard end thereof an axle on which the vehicle wheel is mounted, the alignment arrangement comprising:
    a) couplings at the inboard ends of the control arm, each coupling consisting essentially of:
    a bushing through the inboard end of the control arm, the bushing having an axial opening therethrough which receives a mounting bolt having a shank with a head at a first end and a nut at a second end;
    first and second walls fixed with respect to the body or frame member, the first and second walls having first and second lateral slots, respectively, therein, the first and second slots being of a selected width, for receiving the shank of the mounting bolt therethrough with the head facing the first slot and nut facing the second slot, bearing surfaces around the shank for bearing against the first and second walls when the nut is tightened on the shank;
    reaction surfaces on one of the walls, the reaction surfaces disposed adjacent to one of the slots, and
    b) a tool separate from the inboard end of the control arm, the tool comprising:
    a cam portion for engagement with the reaction surfaces on one of the walls when the tool is in operative cooperation with the control arm by being mounted on the head of the mounting bolt or the nut thereon, the cam portion of the tool having a fixed axis of rotation with respect to the bolt when engaging the reaction surfaces for shifting the bolt in the lateral slots in the walls upon rotating the tool to push against one of the reaction surfaces.

2. The alignment arrangement of claim 1 wherein the head of the bolt or nut is polygonal and the cam portion of the tool has a polygonal opening therethrough complementing the head or nut, wherein when the polygonal opening of the tool is placed over and around the head or nut, the axis of rotation of the bolt becomes the axis of rotation of the tool.

3. The alignment arrangement of claim 1 wherein the reaction surfaces comprise a pair of opposed surfaces facing one another and extending from one of the walls, the cam portion of the tool being positioned between the walls when the tool is engaged with the inboard end of the control arm, wherein when the tool is rotated in a first direction the mounting bolt and control arm move away from the vehicle body or frame member to adjust alignment of the wheel, and when the tool is rotated in a second direction the mounting bolt and control arm move toward the vehicle body or frame member to adjust alignment of the wheel.

4. The alignment arrangement of claim 3 wherein the cam portion of the tool has a socket portion therein for cooperation with a driving lug on a wrench handle or power tool.

5. The alignment arrangement of claim 3 wherein the tool comprises a gear with a first socket portion complementing the head of the mounting bolt and wherein the cam comprises a pair of cooperating racks disposed between the opposed surfaces of the reaction component, each cam having a row of teeth and an oppositely facing cam surface facing one of the opposed surfaces, the gear further having a socket portion for receiving a driving lug of a torque applying tool.

6. The alignment arrangement of claim 1 wherein the reaction surfaces are oppositely facing surfaces on a projection and wherein the cam portion of the tool is a curved slot in a rotational body, which curved slot receives the projection.

7. The alignment arrangement of claim 1 wherein the bearing surfaces are on washers disposed between the head of the bolt and one of the walls and between nut and the other wall.

8. The alignment arrangement of claim 1 wherein the bearing surfaces are radially extending surfaces on at least the head or the nut.

9. The alignment arrangement of claim 1 wherein the shank portion of the bolt is smooth where the bolt passes through the bushing and is threaded beyond the bushing to receive the nut.

10. The alignment arrangement of claim 1 wherein the control arm is a bottom control arm of a suspension having a bottom control arm and a top control arm.

11. The alignment arrangement of claim 1 wherein the control arm is a top control arm of a suspension having a bottom control arm and a top control arm.

12. An alignment arrangement for adjusting alignment of a pair of steerable vehicle wheels, the alignment arrangement being part of a suspension system supporting on a vehicle body or frame member two inboard ends of two control arms that have at outboard ends thereof axles on which the vehicle wheels are mounted, the alignment arrangement comprising:
    a) couplings at the two inboard ends of the control arms, each coupling consisting essentially of:
    a bushing through the inboard end of the control arm, the bushing having an axial opening therethrough which receives a mounting bolt having a shank with a head at a first end and a nut at a second end;
    first and second walls on brackets fixed with respect to the body or frame member, the first and second walls having first and second lateral slots, respectively, therein; the first and second slots being of a selected width for receiving the shank of the mounting bolt therethrough with the head facing the first slot and nut facing the second slot, bearing surfaces around the shank for bearing against the first and second walls when the nut is tightened on the shank,
    reaction surfaces on one of the walls, the reaction surfaces dispose adjacent to one of the slots, and
    b) a pair of tools separate from the inboard ends of the control arms, the tools comprising:
    cam portions for engagement with the reaction surfaces on the walls of the couplings when the tools are in operative cooperation with the control arms by being mounted on the heads of the mounting bolts or the nuts thereon, the cam portions of the tools having fixed axes of rotation with respect to the bolts when engaging the reaction surfaces for shifting the bolts in the lateral slots in the walls upon rotating the tools to push against the reaction surfaces.

13. The alignment arrangement of claim 12 wherein the bearing surfaces are on washers disposed between the heads of the bolts and one of the walls and between the nuts and the other walls.

14. The alignment arrangement of claim 12 wherein the bearing surfaces are radially extending surfaces on at least one of the heads and nuts.

15. The alignment arrangement of claim 12 wherein the shank portions of the bolts are smooth where the bolts pass through the bushings and are threaded beyond the bushings to receive the nuts.

16. The alignment arrangement of claim 12 wherein the control arms are bottom control arms of a suspension having bottom control arms and top control arms.

17. The alignment arrangement of claim 12 wherein the control arms are top control arms of a suspension having bottom control arms and top control arms.

18. The alignment arrangement of claim 12 wherein the first reaction surface is the edge of a notch through one of the walls.

19. The alignment arrangement of claim 12 wherein the brackets each have flanges thereon, one of which flanges is welded to the top of the frame rail the other of which flanges is welded to the side of the frame rail and has a surface thereon which provides one of the reaction surfaces engageable by a cam surface of one of the tools.

20. The alignment arrangement of claim 12 wherein the suspension system is a front wheel suspension system.

21. The alignment arrangement of claim 12 wherein the suspension system is a rear wheel suspension system.

* * * * *